United States Patent [19]

Taggart et al.

[11] Patent Number: 4,919,912
[45] Date of Patent: Apr. 24, 1990

[54] PROCESS FOR THE TREATMENT OF SULFUR CONTAINING GASES

[75] Inventors: George W. Taggart, Dallas; Lawrence T. Denk, Garland; J. Michael Lawrence, Plano, all of Tex.

[73] Assignee: Ford, Bacon & Davis Incorporated, Richardson, Tex.

[21] Appl. No.: 788,818

[22] Filed: Oct. 18, 1985

[51] Int. Cl.$^5$ ............................................. C01B 17/04
[52] U.S. Cl. ................................ 423/574 R; 423/222; 423/574 L; 423/575
[58] Field of Search ............... 423/574 R, 574 G, 576, 423/540, 222, 564, 574 L, 575

[56] References Cited

U.S. PATENT DOCUMENTS

| | | | |
|---|---|---|---|
| 1,832,448 | 11/1931 | Coleman et al. | 423/574 L |
| 1,916,824 | 7/1933 | Braus | 423/564 |
| 3,970,744 | 7/1976 | Riesenfeld | 423/574 R |
| 4,085,199 | 4/1978 | Singleton et al. | 423/576 |
| 4,113,849 | 9/1978 | Atwood | 423/574 R |
| 4,141,962 | 2/1979 | Dupuy et al. | 423/576 |
| 4,150,104 | 4/1979 | Herpers et al. | 423/574 R |
| 4,153,674 | 5/1979 | Verloop et al. | 423/574 R |
| 4,263,270 | 4/1981 | Groenendaal et al. | 423/574 R |
| 4,507,275 | 3/1985 | Reed | 423/574 R |

FOREIGN PATENT DOCUMENTS

| | | | |
|---|---|---|---|
| 534395 | 12/1956 | Canada | 423/574 |
| 7507553 | 12/1976 | Netherlands | 423/574 R |
| 1010010 | 4/1983 | U.S.S.R. | 423/540 |
| 1332337 | 10/1973 | United Kingdom | 423/228 |

OTHER PUBLICATIONS

Paraffins—Chemistry and Technology, Asinger, Pergamon Press, 1968, p. 14.
Advances in Petroleum Chemistry and Refining, Ed. McKetta, Intersciences Publishers, Inc., 1960, vol. 3, p. 440.

Primary Examiner—Jeffrey Edwin Russel
Attorney, Agent, or Firm—Richards, Medlock & Andrews

[57] ABSTRACT

Process of treating sulfur containing gas streams by the Claus reaction in which a recycle stream containing a reactive component is employed in a negative feedback mode to maintain the sulfur producing Claus reaction at approximately equilibrium conditions. The feedstream may contain hydrogen sulfide or sulfur dioxide in a minor amount in an inert gas background. In one embodiment the feedstream to the reaction zone contains a stoichiometrically excess amount of sulfur dioxide for the Claus reaction. Effluent from the reaction zone is passed to a hydrogenation zone where the sulfur dioxide is converted to hydrogen sulfide. Hydrogen sulfide is extracted from the hydrogenation zone effluent and recycled to the Claus reaction zone. In another embodiment the feedsteam may contain a stoichiometrically excess amount of hydrogen sulfide. Effluent from the reaction zone is treated to produce a hydrogen sulfide containing recycle stream which is then subject to at least partial oxidation to produce a converted stream containing sulfur dioxide. The converted stream is recycled to the reaction zone. The invention may be employed in the high pressure processing of hydrocarbon gases containing sulfur.

32 Claims, 4 Drawing Sheets

PROCESS FOR THE TREATMENT OF SULFUR CONTAINING GASES

TECHNICAL FIELD

This invention relates to the treatment of sulfur containing gas streams to recover sulfur therefrom and more particularly to the processing of such streams by recycling at least one reactive sulfur component to the sulfur producing zone.

BACKGROUND OF THE INVENTION

The recovery of elemental sulfur from sulfur containing gas streams by the Claus process is a widely practiced procedure. In this procedure elemental sulfur is produced by the well known Claus reaction as follows:

$$2H_2S + SO_2 \rightleftharpoons 3S + 2H_2O \tag{1}$$

Under normal circumstances, the feed gas to the Claus process contains a substantial portion of hydrogen sulfide which is partially oxidized to produce sulfur dioxide in an amount approximately satisfying the stoichiometric relationship indicated by reaction (1). Thus, sufficient oxygen is supplied to the hydrogen sulfide containing stream under combustion conditions to oxidize about ⅓ of the hydrogen sulfide to sulfur dioxide. The two reactants then produce elemental sulfur in a Claus reactor over a catalyst such as bauxite or alumina. This so called partial combustion process requires a relatively high hydrogen sulfide content normally on the order of about 50 volume percent or more. Where the hydrogen sulfide concentration is substantially lower than this value, it is difficult to maintain stable partial combustion under industrially feasible conditions. In the case of feedstreams containing hydrogen sulfide concentrations of less than 50 volume percent, it is a normal practice to employ the so called "split stream" Claus process. In this procedure approximately ⅓ or more of the feedstream is diverted to a combustion zone where oxidation of the hydrogen sulfide to sulfur dioxide is carried out in the presence of an amount of oxygen adequate to provide sulfur dioxide in sufficient amount as indicated by reaction (1). The remaining portion of the stream is not treated so that when the split portions are recombined and passed to the Claus reactor, the combined input stream contains the hydrogen sulfide and sulfur dioxide in the approximately stoichiometric amounts of two parts hydrogen sulfide for one part sulfur dioxide. For a further description of the Claus process reference is made to Kohl et al *Gas Purification*, Second Edition, Gulf Publishing House, 1974, pages 370-380 under the heading "The Claus Process", the disclosure which is incorporated herein by reference. The tail gases from Claus sulfur recovery units still include sulfur compounds which may be present in concentrations ranging from a fraction of a percent up to several percent. The principal sulfur compounds are hydrogen sulfide and sulfur dioxide. These may be present in the approximate proportions of ⅔ hydrogen sulfide and ⅓ sulfur dioxide as indicated by the stoichiometry of reaction (1) or, in some cases, substantial concentrations of other reduced sulfur compounds may be encountered. The reduced sulfur components typically encountered, in addition to hydrogen sulfide, include carbonyl sulfide, carbon disulfide, and organic thio compounds such as the mercaptans. While the principal oxidized or unreduced sulfur compound is sulfur dioxide, elemental sulfur in a fine mist and as vapor is usually present in the off gas to some extent. At this point in the processing the major components of the off gas are inert gas components such as steam, nitrogen and carbon dioxide.

In the current regulatory environment, the sulfur contaminants in the Claus unit off gas (tail gases) are well in excess of those which can be released to the atmosphere. While many procedures are available for reducing the sulfur content of the exhaust gas stream, one common procedure involves hydrogenating the unreduced sulfur values, principally sulfur dioxide, in the presence of a hydrogenation catalyst to convert substantially all of the sulfur values to hydrogen sulfide. Typical procedures employed in industry are summarized in Kirk Othmer, *Encyclopedia of Chemical Technology*, Third Edition, Wiley - Interscience, volume 22, pp. 276-282, the disclosure of which is incorporated herein by reference. As disclosed in Kirk-Othmer, the hydrogen sulfide may be absorbed by a solvent which has a high selectivity for hydrogen sulfide in the presence of carbon dioxide and the hydrogen sulfide then regenerated from the rich solvent and returned to the front of the Claus process.

As noted above, one relatively simple and straightforward technique for accommodating the treatment of relatively low sulfur content gas stream is the so called split-flow Claus process in which a portion of the feed is diverted from combustion and then recombined with the remainder of the feed. Other more sophisticated procedures have also been proposed. These typically involve a recycle step and may or may not involve split streams. One procedure which is said to be particularly applicable to hydrogen sulfide containing gases having up to 85% volume percent or more carbon dioxide is disclosed in U.S. Pat. No. 4,263,270 to Groenendaal et al. In this process, the feedstream is passed through a nonselective absorption and regeneration unit and then split, with one branch of the stream applied directly to a Claus reactor and the other bypassing the Claus reactor and applied directly to an absorption and regeneration unit which is selective for hydrogen sulfide in the presence of carbon dioxide. The tail gases from the Claus unit are applied to a hydrogenation reactor in which they are subjected to a reduction step for conversion to hydrogen sulfide. The reduced off gases from the hydrogenation reactor are then applied to the selective absorption regeneration unit and hydrogen sulfide gas recovered from the regeneration unit is applied to the split portion of the stream which is fed directly to the Claus plant.

Another process involving the recycle of hydrogen sulfide, which is similar in some respects to the Groenendaal process, is disclosed in U.S. Pat. No. 4,153,674 to Verloop et al. In this procedure, the feedstream is applied through a nonselective absorption unit and to the effluent side of a Claus sulfur recovery unit, completely bypassing the Claus unit. The effluent from the Claus unit is applied through a heater and reduction reactor to convert the sulfur values to hydrogen sulfide. The output from the reduction reactor is passed to a selective absorption unit. A recycle gas which is relatively rich in hydrogen sulfide is recovered from the absorption unit and applied to the front of the Claus sulfur recovery unit. This gas, either with or without supplementation with a hydrogen sulfide rich gas of low carbon dioxide content, provides the sole input to the Claus unit.

Another method for processing low hydrogen sulfide gas streams is disclosed in U.S. Pat. No. 4,113,849 to Atwood. In this process, a Claus unit reactor is operated at a relatively low pass yield e.g. about 65% based upon the hydrogen sulfide content, and the reactor tail gas is applied to an incinerator to oxidize the unreacted hydrogen sulfide to sulfur dioxide. The $SO_2$ is ultimately extracted from the tail gas stream by a solvent absorption and regeneration procedure to arrive at a sulfur dioxide containing recycle gas which is mixed with the hydrogen sulfide feedstream at the input to the Claus unit. The Atwood process is said to be self balancing in the sense that, if the yield in the Claus reactor exceeds 67%, a less than stoichiometrically equivalent amount of sulfur dioxide will be contained in the recycle gas, thus retarding the Claus reaction to a maximum of 67%. In addition, the Atwood reference discloses splitting of the feedstream to divert a portion thereof directly to the incinerator for direct combustion to sulfur dioxide, thus increasing the sulfur dioxide concentration in the recycle gas.

DISCLOSURE OF THE INVENTION

In accordance with the present invention there is provided a new and improved process for the treatment of sulfur containing gas streams which may contain predominantly sulfur dioxide or predominantly hydrogen sulfide in an inert background. A recycle stream is employed in a negative feedback mode to maintain the sulfur producing reaction at approximately equilibrium conditions without the need to adjust component concentrations or flow rates for the feed or recycle streams.

In accordance with one embodiment of the invention, there is provided a process for the treatment of a feedstream which contains sulfur dioxide in an amount in excess of the stoichiometric equivalent for the Claus reaction (1). The sulfur dioxide containing feed gas is passed to a reaction zone for the production of elemental sulfur by the Claus reaction. The off gas stream from the Claus reaction, which contains sulfur dioxide, is passed to a hydrogenation zone. In this zone the sulfur dioxide is hydrogenated to produce hydrogen sulfide which is contained in the effluent gas stream from the hydrogenation zone. The hydrogen sulfide is extracted from this effluent gas and passed in a recycle stream to the reaction zone where it is available for reaction with sulfur dioxide in the feedstream to produce sulfur by the Claus reaction.

The invention is particularly applicable to the treatment of a feed gas which contains a relatively large inert gas fraction relative to the sulfur dioxide content. Preferably the hydrogenation zone effluent is extracted by passing the effluent to an absorption zone within which the gas stream is contacted by an absorption solvent which is a preferential absorbent for hydrogen sulfide in the presence of the inert gas fraction. Rich solvent from the absorption zone is passed to a desorption zone where the solvent is regenerated by stripping hydrogen sulfide from the rich solvent to produce hydrogen sulfide which is applied in the recycle stream.

In a further embodiment of the invention, the feed gas stream is derived by oxidation of a source gas which contains sulfur in the form of hydrogen sulfide or other combustible forms to provide the sulfur dioxide contained in the feed gas stream. In a particular aspect of this embodiment of the invention, the source gas is a Claus unit tail gas which contains hydrogen sulfide and sulfur dioxide as a minor fraction in a major fraction inert gas background.

In a further embodiment of the invention, the feedstream is derived by thermal decomposition of oxidized sulfur values. Such values include sulfuric acid, sulfate salts and mixtures thereof such as are typically found in the spent sulfuric acid catalyst from alkylation operations.

Another embodiment of the invention is applicable to the treatment of a feedstream which contains hydrogen sulfide in an amount in excess of the stoichiometric equivalent for the Claus reaction. In this embodiment of the invention, the hydrogen sulfide containing feed gas stream is applied to a reaction zone for the production of elemental sulfur by the Claus reaction. The off gas from the reaction zone is treated, preferably after processing to eliminate sulfur dioxide and other unreduced sulfur values by an extraction procedure to produce a hydrogen sulfide containing recycle stream. The hydrogen sulfide containing recycle stream is subject to at least partial oxidation of the hydrogen sulfide to produce a converted recycle stream containing sulfur dioxide. The converted recycle stream is then applied to the reaction zone. Preferably the off gas stream from the reaction zone is applied to a hydrogenation zone prior to the extraction step. In the hydrogenation zone, sulfur dioxide and also elemental sulfur, which is present in the off gas stream, are hydrogenated to produce hydrogen sulfide.

BEST MODES FOR CARRYING OUT THE INVENTION

Figure 1:
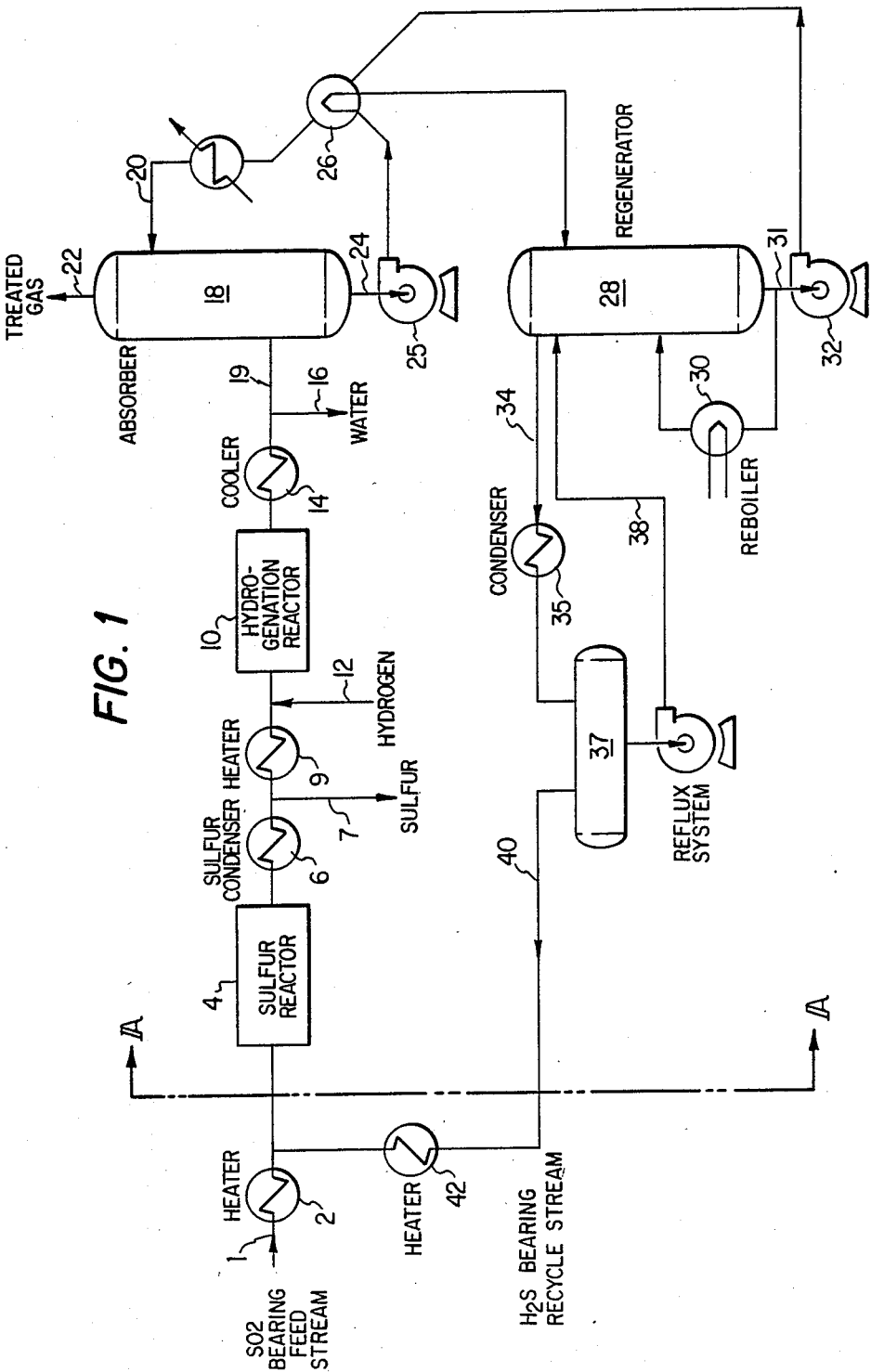
FIG. 1 is a schematic illustration showing a flow diagram for one embodiment of the invention.

The Claus processing of gas streams containing low hydrogen sulfide concentrations in an inert background is difficult and expensive and requires special treatment facilities and techniques as noted previously. There are other sulfurous gases, principally gases containing sulfur dioxide but also containing such compounds as carbonyl sulfide, mercaptans and carbon disulfide which are difficult to process at all. The present invention provides a practical procedure for processing such streams, as well as more conventional Claus process streams, in a manner which is economical and fundamentally self-regulating.

The present invention employs a negative feedback procedure in which a portion of the output from a chemical reaction in the form of at least one of the reactants of the reaction is applied to the input of the reaction zone in a manner to dampen a transient stoichiometric imbalance between the reactants to arrive at a steady state, or near steady state, condition of stoichiometric imbalance. The reactant fraction recycled to the reaction zone is derived from a stoichiometric excess of a reactant in the reaction zone, and in addition may be due to the thermodynamic reversibility of the reaction within the reaction zone (the reaction does not go to completion as indicated by the equilibrium constant of the reaction under the reaction conditions), the conversion of a reactant or product after it leaves the reaction zone, and in some cases a composite of several or all of these factors.

In the basic Claus reaction for the production of elemental sulfur as indicated by relationship (1), the stoichiometric ratio of hydrogen sulfide to sulfur dioxide is 2. In the present invention, the Claus reaction may be carried out at a substantial deviation from the theoretical stoichiometric ratio and without external control of the reactant concentrations. The actual ratio of the reactants will be determined by the relationship of the recycle stream to the basic feed stream. The self-regulating function of the present invention may be illustrated by reference to the simplest form of the invention where it is assumed that the processed feed stream contains only sulfur dioxide in an inert gas fraction which typically will include carbon dioxide, water and nitrogen. In this case, the feedstream will be heated and passed to a sulfur producing catalytic reactor. The catalyst employed may be of any suitable type for use in implementing the Claus reaction such as bauxite or alumina. In embodiments of the invention in which combustion of hydrogen sulfide in either the feed stream or the recycle stream is accomplished as described hereinafter, it normally will be desirable to employ a titania catalyst which is less susceptible to deactivation because of oxygen or sulfur trioxide present in the reaction zone. The output from the reactor is passed through a suitable sulfur condenser in which the elemental sulfur produced by the Claus reaction is condensed and separated for passage to a suitable sulfur pit. The remaining Claus off gas is applied via a heater to a hydrogenation reactor which is also supplied with a suitable hydrogen source gas such as molecular hydrogen or carbon monoxide which is reacted with water in the presence of a catalyst in accordance with the water gas shift reaction to produce hydrogen. The hydrogenation reaction converts the sulfur dioxide contained in the off gas to hydrogen sulfide. The hydrogen sulfide is then selectively extracted for recycle to the sulfur reactor. Extraction may be accomplished by any suitable adsorption or absorption and regeneration procedure which is selective for the hydrogen sulfide relative to the inert gas background.

Considering only the sulfur dioxide content of the feedstream and assuming for illustrative purposes only that the Claus reaction is irreversible and goes to completion to the extent permitted by the stoichiometrically limiting reactant, that all sulfur produced is withdrawn from the system, and that all unreacted sulfur is converted to hydrogen sulfide and recycled, the sulfur balance for successive passes through the system would be indicated by Table I. In Table I, columns 1-9 indicate the idealized relative concentrations at successive pass times for sulfur dioxide in the feed, hydrogen sulfide recycled, total sulfur (the sum of sulfur in the sulfur dioxide and hydrogen sulfide,) produced sulfur and residue sulfur which is hydrogenated and recycled for the next pass.

TABLE I

|  | 1 | 2 | 3 | 4 | 5 | 6 | 7 | 8 | 9 |
|---|---|---|---|---|---|---|---|---|---|
| Feed $SO_2$ | 1 | 1 | 1 | 1 | 1 | 1 | 1 | 1 | 1 |
| Recyc $H_2S$ | 0 | 1 | .5 | .75 | .63 | .69 | .65 | .68 | .67 |
| Total S | 1 | 2 | 1.5 | 1.75 | 1.63 | 1.69 | 1.66 | 1.68 | 1.67 |
| Prod. S | 0 | 1.5 | .75 | 1.12 | .94 | 1.04 | .98 | 1.01 | 1.00 |
| Res S | 1 | .5 | .75 | .63 | .69 | .66 | .68 | .67 | .67 |

In Table I for the initial pass indicated by column 1 and assuming the $SO_2$ concentration is unity (1), there is no elemental sulfur produced by the Claus reactor and all of the sulfur dioxide is hydrogenated and recycled as hydrogen sulfide. In column 2, indicative of the second pass through the system, total sulfur content is 2 and the produced sulfur (limited by hydrogen sulfide which is the stoichiometrically limiting reactant) is 1.5. The remaining sulfur dioxide is hydrogenated to produce 0.5 hydrogen sulfide which is recycled to produce the balance indicated in column 3. From a review of Table I it can be seen that with continuing operation, the system will stabilize to the situation shown in column 9 where the ratio of $H_2S$ to $SO_2$ is about 0.67 and the total produced sulfur is 1. Of course, if the concentration of sulfur dioxide in the feedstream changes, the system would again go into an unbalanced state which would stabilize with successive passes through the system to the equilibrium condition.

It will be recognized that the system is continuous and that the discrete conditions depicted in Table I are indicative of conditions which prevail instantaneously during the continuously changing system. It will be noted also that the conditions depicted in Table I are representative of a situation in which a step-upset from zero is imposed. In actual practice, the procedures for bringing the system on-line would avoid such rapid changes and variations of feed rates and compositions would be relatively smooth and gradual, thus avoiding the extreme swings implied by the first several columns of Table I.

The example given immediately above makes several fundamental assumptions which are not found in actual practice. The most important deviation from the idealized concept is that the Claus reaction is reversible and in practice the reaction will not go to more than about 80% completion. Thus, the reaction products will include at least about 20% of the feed and recycle reactants. In addition, not all of the sulfur produced by the reaction will be condensed and withdrawn. Some will remain in the off gas from the Claus unit in the form of a mist of sulfur and sulfur vapor. This is converted to hydrogen sulfide along with the sulfur dioxide. Also, not all of the hydrogen sulfide will be extracted by the absorption and regeneration procedure. Some small amount, dependent upon the absorption procedure, but preferably less than 10 ppm, will be released to the atmosphere.

Discounting the sulfur vented to the atmosphere, the sulfur balance around a sulfur producing zone with recycle is stated as follows:

$$S_F + S_R = S_P + S_R \qquad (2)$$

$$S_F = S_P \tag{3}$$

The subscripts F, P and R are employed to indicate feed, product and recycle, respectively.

Since the produced sulfur, $S_P$, is less than three times the total sulfur dioxide content in the system and less than 1.5 times the total hydrogen sulfide content in the system one of the following relationships prevail.

$$S_P < 3(SO_{2F} + SO_{2R}) < 1.5(H_2S_F + H_2S_R) \tag{4}$$

or $$S_P < 1.5(H_2S_F + H_2S_R) < 3(SO_{2F} + SO_{2R}) \tag{5}$$

or $$S_P < 3(SO_{2F} + SO_{2R}) = 1.5(H_2S_F + H_2S_R) \tag{6}$$

In any case, if $SO_{2R} = 0$:

$$S_P = H_2S_F + SO_{2F} < 3\ SO_{2F} \tag{7}$$

$$H_2S_F < 2\ SO_{2F} \tag{8}$$

$$H_2S_F / SO_{2F} < 2 \tag{9}$$

if $H_2S_R = 0$ $$S_P = H_2S_F + SO_{2F} < 1.5\ H_2S_F \tag{10}$$

$$SO_{2F} < 1.5\ H_2S_F \tag{11}$$

$$2 < H_2S_F / SO_{2F} \tag{12}$$

The feed may contain both compounds but in ratio which deviates from stoichiometric. In addition, the recycle stream may also contain both compounds.

Turning now to FIG. 1 of the drawings, there is illustrated schematically a process for treating a sulfur dioxide containing feedstream 1 which contains sulfur dioxide in an amount in excess of the stoichiometric equivalent for the Claus reaction. That is, the feedstream is either free of hydrogen sulfide or if it contains hydrogen sulfide it is present in an amount to provide a mole ratio of sulfur dioxide to hydrogen sulfide in excess of 0.5. The feedstream is applied through a heater 2 to a sulfur producing reactor 4. The reactor preferably is a catalytic reactor. The heater 2 is operated to heat the feedstream to a temperature suitable for the Claus conversion reaction; e.g. typically within the range of 150° C.–300° C. Within the reaction zone 4, the Claus reaction is carried out over a suitable Claus reaction catalyst such as alumina, titania, or bauxite. The output from reactor 4 is passed through a sulfur condenser 6 where elemental sulfur is cooled and passed via line 7 to a sulfur pit (not shown).

The effluent from the sulfur condenser is applied via a heater 9 to a hydrogenation reactor 10 for reduction of sulfur dioxide and any elemental sulfur which may be present to hydrogen sulfide. Molecular hydrogen or another suitable hydrogen source gas, [e.g. by reaction between carbon monoxide and water in the water gas shift reaction,] is supplied to the reactor via a line 12. The hydrogen normally will be supplied in an amount in excess of the stoichiometrically equivalent amount for the conversion reactions in order to ensure complete conversion to hydrogen sulfide.

The heater 9 is operated to heat the gas stream to a value sufficient to provide a temperature within the hydrogenation zone within the range of about 150° C.–650° C. and preferably about 250° C.–450° C. Normally, a hydrogenation catalyst such as metal or metal oxides from metals of groups VA, VIA, and VIII and the rare earth series of the Periodic Table will be employed. Such catalyst may take the form of cobalt, molybdenum, iron, chromium, vanadium, thorium, nickel, tungsten and uranium and mixtures thereof and their oxides. These metals or metallic compounds are activated by sulfidation in the catalytic reactor.

The hydrogen sulfide containing effluent from the hydrogenation zone 10 is cooled in cooler 14 and to a temperature of about 40° C. to condense the steam in the effluent. The cooling step may be carried out in two stages. In the first stage heat is lost to low pressure steam to achieve a cooling to about 150° C. In the second stage the stream is cooled to about 40° C. by direct contact with circulating water. Water is removed via line 16 and the effluent gas stream is then subjected to a suitable extraction process to recover hydrogen sulfide. As noted previously, extraction of hydrogen sulfide may be accomplished through the means of any suitable adsorbent or absorbent. The preferred mode of operation, particularly where the feed contains a high fraction of an inert gases, is to employ an absorption solvent which is highly selective for hydrogen sulfide in the presence of the inert gas fraction. Specifically, this will include a solvent which is highly selective for hydrogen sulfide in the presence of carbon dioxide which tends to readily absorb along with hydrogen sulfide. Suitable solvents include aqueous solutions of an organic or inorganic alkaline material which absorbs the hydrogen sulfide in a heat reversible relationship. Organic hydrogen sulfide absorbents which may be employed in formulating the solvent solution include organic amines. Such compounds may take the form of substituted or unsubstituted aliphatic, cycloalkyl, aryl, or heteraryl amines. Certain basic amino acids and amides are absorbent of hydrogen sulfide and may also be employed. Suitable organic compounds thus include dimethyl formamide, morpholine, and various amino alcohols and particularly the alkanolamines, including the mono- or poly- alkanolamines. Thus, examples of suitable absorbents include aqueous solutions of monoethanolamine, diethanolamine, triethanolamine, alkylalkanolamines such as methyldiethanolamine and ethylaminoethanol, diisopropanolamine, di-n-propanolamine, n-propanolamine, isopropanolamine, cyclohexylaminoethanol, and 2-amino-2-methyl-1-propanol. The tertiary amines exhibit a greater tendency for the preferential absorption of hydrogen sulfide in the presence of carbon dioxide than do the primary amines and to a lesser extent, the secondary amines. Accordingly, it will be preferred in practicing the present invention to use a tertiary amine such as methyldiethanolamine or triethanolamine. A particular suitable tertiary amine is methyldiethanolamine. Preferably, the alkaline absorbent for hydrogen sulfide is present in the aqueous solution in an amount within the range of 20–60 percent. Such amines may be employed in aqueous solution with an organic or inorganic acid. For example, the absorbing solvent may take the form of tertiary amines such as methyldiethanolamine and triethananolamine present with a minor part of an acid such as phosphoric acid.

The effluent gas is passed from cooler 14 to an absorption column 18 via line 19. The absorption column 18 may take the form of a bubble tray or a packed column as will be understood by those skilled in the art. Normally, the absorbent will be applied via line 20 to the top of the column where it flows in countercurrent flow with the hydrogen sulfide containing gas. The gas stream is applied to the bottom of the column via line 19 and the desorbed gas stream is withdrawn from the column at the top via line 22. The gas can be treated to contain about 10 ppm or less hydrogen sulfide or to such higher limits as may be permitted by environmental and regulatory considerations. The treated gas can be vented to the atmosphere or may be passed to a downstream processing unit. For example, when the inert gas background is comprised predominantly of carbon dioxide over nitrogen, the treated gas stream may be applied to a carbon dioxide recovery facility. Where the treated gas is a hydrocarbon stream passed to a pipeline, it normally should contain no more than 4 ppm hydrogen sulfide.

The rich solvent is withdrawn via line 24 from the bottom of the tower and pumped by pump 25 through a heat exchanger 26 to a regeneration column 28. The heat exchanger 26 provides indirect heat exchange of the rich solvent with the regenerated solvent supplied from desorption column 28 in line 20. In the desorption column, the rich absorbent is heated by steam supplied to a reboiler 30 to strip hydrogen sulfide from the rich solvent. The lean regenerated solvent is withdrawn at the bottom of the column 28 in line 31 and applied via pump 32 to line 20 and the top of the absorption column 18. The overhead gas from the regenerator 28 is applied in line 34 to a condenser 35 where it is cooled. Condensed water and solvent is withdrawn in a reflux system 37 and pumped via line 38 to the top of the desorption column 28. The recycle stream which is highly enriched in hydrogen sulfide and has a high hydrogen sulfide/carbon dioxide ratio in comparison of that of the feedstream is withdrawn from the reflux unit 37 line 40 applied via a heater 42 to the front end of the sulfur producing reactor 4.

The hydrogen sulfide bearing recycle gas stream preferably is heated by means of a heater 42 independently of the sulfur bearing feedstream. This offers an advantage over supplying the recycle stream upstream of the feedstream heater 2 in that it minimizes sulfur deposition in the system (due to premature reaction between hydrogen sulfide and sulfur dioxide) and also enables the recycle stream to be heated to the proper temperature not withstanding that wide variations in flow rates may occur in the feed gas stream.

By way of an example illustrating the operation of this embodiment of the invention, the feedstream to heater 2 has a composition on a dry basis in pound-mols per hour as follows:

TABLE II $SO_2$ 0.05
$CO_2$ 3.0
$CO$ 3.0
$H_2O$ 12.0
$N_2$ 82.0

Based upon a simulator for the process under defined reaction conditions of 204° C. and 25.2 psia, the system will equilibrate to produce a sulfur product withdrawn via line 7 at 0.05 pound-mol/hr. and $H_2S$ content in the treated gas released via line 22 of about 10 ppm. The recycle stream at equilibrium conditions contains 0.68 pound-mols per hr. of hydrogen sulfide. The resulting $H_2S/SO_2$ ratio of about 13.6 is, of course, well above the ideal stoichiometric ratio of these components. A theoretical sulfur balance for successive passes through this system, similar to that shown for Table I above, is illustrated below in Table III. In Table III, A & B, Columns 1-17 and 32 (Columns 18-31 not shown) indicate the sulfur balances for successive passes through the system. As shown by the initial columns in Table III(A), because of the extremely low initial sulfur dioxide concentration, all of the elemental sulfur produced by the Claus reaction is recycled in mist and vapor form with no net sulfur product. This is again representative of a step upset response which would not be expected to occur in actual practice.

TABLE III

| | A | | | | | | | |
|---|---|---|---|---|---|---|---|---|
| | 1 | 2 | 3 | 4 | 5 | 6 | 7 | 8 |
| Feed $SO_2$ | .05 | .05 | .05 | .05 | .05 | .05 | .05 | .05 |
| Recyc $H_2S$ | 0 | .05 | .15 | .20 | .25 | .30 | .35 | .39 |
| Total S | .05 | .10 | .20 | .25 | .30 | .35 | .40 | .44 |
| Prod. S | 0 | 0 | 0 | 0 | 0 | 0 | .01 | .02 |
| Res. S | .05 | .10 | .20 | .25 | .30 | .35 | .39 | .42 |
| | B | | | | | | | | |
| | 9 | 10 | 11 | 12 | 13 | 14 | 15 | 16 | 17 | 32 |
| Feed $SO_2$ | .05 | .05 | .05 | .05 | .05 | .05 | .05 | .05 | .05 | .05 |
| Recyc $H_2S$ | .42 | .44 | .46 | .48 | .50 | .51 | .52 | .53 | .54 | .68 |
| Total S | .47 | .49 | .51 | .53 | .55 | .56 | .57 | .58 | .59 | .73 |
| Prod. S | .03 | .03 | .03 | .03 | .04 | .04 | .04 | .04 | .04 | .05 |
| Res. S | .44 | .46 | .48 | .50 | .51 | .52 | .53 | .54 | .55 | .68 |

The thermodynamic equilibrium condition for the Claus reaction within reaction zone 4 will vary depending upon temperature, pressure and product and reactant concentrations, as will be understood by those skilled in the art. Accordingly, even though the reaction conditions within the reaction zone are maintained relatively constant, it will be recognized that transient changes in the reaction equilibrium occur from one pass to the other because of changes in product and reactant concentrations as can be seen from a review of Table III. Also, it can be seen that the nature of the feedback mechanism is such that precise control of the reaction is not required.

In a second example of the embodiment of the invention illustrated in FIG. 1, an assumed feedstream make-up is as follows:

TABLE IV

| $SO_2$ | 116.67 |
| $CO_2$ | 855.56 |
| $H_2O$ | 198.79 |
| $N_2$ | 700.0 |

In this case the estimated sulfur balances for successive passes through the system are indicated in Table V by columns 1-8.

TABLE V

| | 1 | 2 | 3 | 4 | 5 | 6 | 7 | 8 |
|---|---|---|---|---|---|---|---|---|
| Feed $SO_2$ | 116.7 | 116.7 | 116.7 | 116.7 | 116.7 | 116.7 | 116.7 | 116.7 |
| Recyc $H_2S$ | 0 | 116.7 | 78.3 | 87.5 | 84.5 | 86.1 | 85.3 | 85.7 |
| Total S | 116.7 | 233.4 | 195.0 | 204.2 | 201.2 | 202.8 | 202.0 | 202.4 |
| Prod. S | 0 | 155.1 | 101.5 | 119.7 | 115.7 | 117.5 | 116.3 | 116.7 |
| Res. S | 116.7 | 78.3 | 87.5 | 84.5 | 86.1 | 85.3 | 85.7 | 85.7 |

As indicated in the last column the recycle stream at equilibrium contains 85.7 pounds-mols per hour of hydrogen sulfide providing a H$_2$S/SO$_2$ ratio of about 0.7 and a sulfur product production of 116.7 pound-mols per hour. The sulfur discharged to the atmosphere as H$_2$S is about 10 ppm. It is to be recognized that the values given in Table V are instantaneous rates and that in actual practice the relationships will be significantly more complex than those implied by the data set forth in Tables III and V.

Returning to FIG. 1, an alternative procedure for this embodiment of the invention involves passing the outlet from the hydrogenation zone to a hydrolysis zone for the hydrolysis of reduced sulfur values in the hydrogenation zone effluent to produce hydrogen sulfide. In this case, a hydrolysis reactor (not shown) is interposed between the hydrogenation reactor 10 and cooler 14 of FIG. 1. This embodiment of the invention is particularly useful where the sulfur dioxide bearing feedstream contains carbon monoxide, which is subject to reaction with sulfur or hydrogen sulfide to produce carbonyl sulfide, and possible minor amounts of carbon disulfide. This process is particularly useful in treating, for example, the gas produced by a fluid catalytic cracking unit when such gas contains a significant quantity of carbon monoxide.

The hydrolysis reaction is carried out in the presence of a suitable hydrolysis catalyst such as alumina, titania and other metal oxides of groups IIIA and IVB. Titania is the preferred catalyst. In a further aspect of this embodiment of the invention, the effluent stream from the hydrogenation reactor is subjected to a hydration step in order to add water prior to passage of the gaseous stream of the hydrolysis zone. It may also be desirable to heat the input stream to the hydrolysis zone. For example, the hydrolysis reaction normally should be carried out at a temperature within the range of about 250° C.–500° C. whereas the hydrogenation reaction preferably is carried out at a temperature within 250° C. –450° C. as noted previously.

In a further embodiment of the present invention which is particularly applicable to the treatment of Claus unit tail gases in which sulfur dioxide and hydrogen sulfide are present in an inert gas background which provides the primary gas fraction, reduced sulfur values in the feed gas stream may be subjected to a hydrolysis reaction to produce hydrogen sulfide. In this respect, Claus unit tail gases will normally contain reduced sulfur values in the form of carbonyl sulfide and/or carbon disulfide which are readily converted to hydrogen sulfide by hydrolysis. The hydrolysis reaction may be carried out concomitantly with the hydrogenation step in reactor 10 of FIG. 1 or it may be carried out prior to this step.

In the former case, simultaneous hydrolysis and hydrogenation may be carried out by procedures such as disclosed in U.S. Pat. No. 3,752,877 to Beavon. Such simultaneous hydrolysis and hydrogenation processes are well known to those skilled in the art. For a further description thereof, reference is made to the aforementioned patent to Beavon which is incorporated herein by reference. In the alternative procedure, the hydrolysis reaction is carried out intermediate the sulfur producing reaction in reactor 4 and the hydrogenation reaction carried out in reactor 12 of FIG. 1. In this embodiment of the invention the hydrolysis reaction will normally be carried out after cooling of the effluent stream from reactor 4 and the recovery of the sulfur product therefrom.

Figure 2:
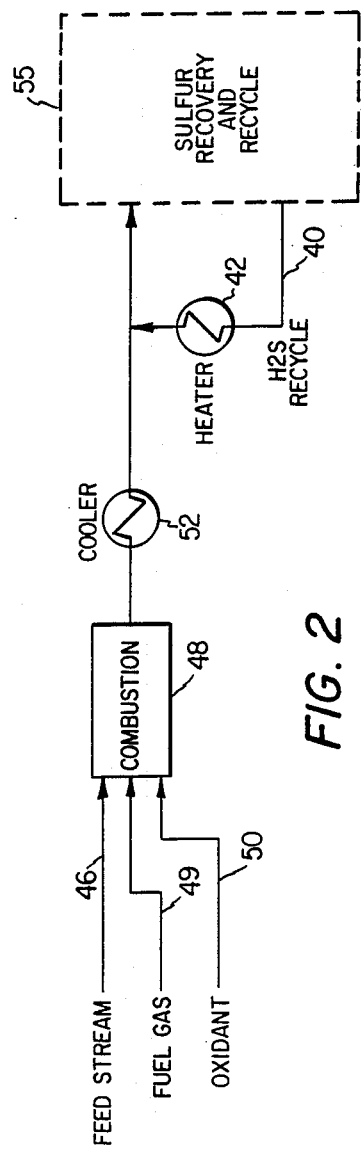
FIG. 2 is a schematic illustration of another embodiment of the invention employing a preoxidizing step.

Another embodiment of the invention in which the feedstream is derived by oxidation of a source gas containing sulfur values in combustible form to produce sulfur dioxide in the feed stream is shown in FIG. 2. The principle combustible sulfur value in the source gas stream normally will be hydrogen sulfide although other oxidizable sulfur containing compounds such as carbon disulfide, carbonyl sulfide, and organic sulfides or mercaptans may be present in addition to or instead of hydrogen sulfide. More particularly and as shown in FIG. 2, a sulfur containing feedstream 46 is applied to a combustion chamber 48 along with an optional fuel gas stream 49 such as methane and an oxidant stream 50 such as air, oxygen or oxygen enriched air. The input streams to the combustion zone 48 are adjusted so that the oxidizing agent is present in a stoichiometrically balanced amount relative to the combustible components in order to ensure substantially complete conversion to sulfur dioxide.

Minor deviations from stoichiometric balance of the oxidizing agent can easily be accommodated in the practice of the invention. Usually it will be preferred to provide a tolerance range biased to slightly less than the stoichiometric equivalent amount of oxygen in order to minimize the presence of oxygen which is carried over to the sulfur producing reaction zone. The combustion chamber typically is at a temperature within the range of about 975° C. 1500° C. The effluent from the combustion chamber is passed through a cooling system as indicated by cooler 52.

As an alternative to thermal oxidation, the feedstream 46 may be oxidized catalytically in a catalytic reaction zone. Any suitable oxidation catalyst may be used in this aspect of the invention. Such catalysts include alumina, bismuth oxide, vanadium oxide, titanium oxide, and their mixtures as well as other suitable catalytic agents. In either thermal or catalytic oxidation steps, small quantities of SO$_3$ may be produced. Such SO$_3$ will be rapidly reduced to SO$_2$ by contact with the H$_2$S recycle stream. Thus, the SO$_3$ will not interfere with the normal processing relationships involved in the subsequent treating process.

The remainder of the system indicated by reference character 55 normally will include a sulfur recovery hydrogenation and recycle system identical in all respects with that shown in FIG. 1 to the right of bracket A—A. Thus, the recycle stream 40 from system 55 is passed via heater 42 and mixed with the output from cooler 52 for application to the sulfur producing reactor (not shown) within unit 55.

The operation of this embodiment of the invention may be exemplified by assuming a source gas feedstream 46 having a component makeup as set forth below in Table VI:

TABLE VI

| | |
|---|---|
| H$_2$S | 116.67 |
| CO$_2$ | 855.56 |
| H$_2$O | 82.12 |

Assuming that the sole combustible component in the combustion chamber is hydrogen sulfide (no added fuel gas via line 49) and assuming further that the oxidizing agent is air, complete combustion of the hydrogen sulfide would produce an effluent stream from zone 48 having the components as set forth in Table IV above. In this case the sulfur balance of the system for successive passes would be the same as indicated in Table V.

A particular advantage in the embodiment illustrated in FIG. 2 is in the processing of source gas streams containing compounds such as carbonyl sulfide and mercaptans which can be completely converted by the combustion process and ultimately recovered. Thus, the embodiment of FIG. 2 is especially useful for the processing of Claus off gas streams which, in addition to containing hydrogen sulfide and sulfur dioxide in a minor fraction in a major inert gas background, also typically contain trace amounts of carbon disulfide, carbonyl sulfide and some elemental sulfur.

The system illustrated in FIG. 2 can also be employed in an embodiment of the invention which is useful in the processing of thermally decomposible sulfur values, principally such oxy compounds as sulfuric acid and sulfate and sulfite salts. A specific aspect is in the recovery of sulfur from spent alkylation sulfuric acid. In this regard, as is well known to those skilled in the art, conventional processes involve the alkylation of aromatic or aliphatic compounds employing sulfuric acid as a catalyst. Such alkylation processes involve the continuous feed of a sulfuric acid catalyst stream and withdrawal of the spent acid stream which contains oxidized sulfur values selected from the group consisting of sulfuric acid and sulfate salts and mixtures thereof. These compounds are subject to thermal decomposition to sulfur trioxide which is reduced to sulfur dioxide in the presence of such reducing agents as hydrogen sulfide or the combustion products of natural gas or other similar fuels. Typically there is a residue of unreduced sulfur trioxide. In this embodiment of the invention, the spent alkylation sulfuric acid, or other feedstream containing thermally decomposible oxidized sulfur values, is applied to the combustion chamber 48 via line 46 along with fuel gas and oxidant through lines 48 and 50 respectively. The combustion chamber is operated at a temperature within the range of 800° C.-1800° C. in order to thermally decompose the sulfites, sulfates and sulfuric acid to provide a sulfur dioxide bearing stream in the effluent. This is applied through the cooler 52 to the recovery and recycle system 55. As the hydrogen sulfide bearing recycle stream 40 is mixed in with the sulfur dioxide bearing stream the hydrogen sulfide acts to reduce any sulfur trioxide in the stream to sulfur dioxide which also reacts in the sulfur reaction zone to produce elemental sulfur. In this embodiment of the invention, the preferred catalyst employed in the sulfur reaction zone is a titania type catalyst in order to reduce the susceptibility of the catalyst to deactivation by the presence of sulfur trioxide and oxygen in the reaction zone.

Yet a further embodiment of the present invention provides a process for the treatment of a hydrogen sulfide bearing feedstream. This embodiment involves oxidation of the recycle stream to convert the recycle stream from the hydrogen sulfide bearing stream to a sulfur dioxide bearing stream. In this case, the feedstream which contains hydrogen sulfide in an amount in excess of the stoichiometric equivalent amount for the Claus reaction with sulfur dioxide is applied to a sulfur producing reactor as indicated in FIG. 1 by reference numeral 4.

The reactor may contain a conventional solid catalyst or an aqueous solution, for example, a solution of sodium citrate or of ammonia. The use of an aqueous sodium citration solution is described in J. B. Rosenbaum et al., Bureau of Mines Report of Investigation RI 7774, "Sulfur Dioxide Emission Control by Hydrogen Sulfide Reaction in Aqueous Solution; The Citrate Process." The reaction also may be carried out in nonaqueous media, more specifically organic solvents such as alcohols and polyalkyleneglycols such as polyethylene glycol solutions as disclosed in U.S. Pat. No. 3,598,529 to Deschamps et al. The organic solvent may contain a catalyst such as an alkali or alkaline earth metal salt of carboxylic acids including polyhydric acids. For a further description of such liquid reaction media, reference is made to the aforementioned RI7774 and patent to Deschamps, the disclosures of which are incorporated herein by reference.

The output from the reactor may or may not, as described below, be applied to a hydrogenation zone, but in either case, the off gas stream from the reaction zone is subject to a hydrogen sulfide extraction step to produce a hydrogen sulfide containing recycle stream. The hydrogen sulfide bearing recycle stream is at least partially oxidized to produce a sulfur dioxide bearing recycle stream which is applied to the sulfur producing reaction zone.

In this embodiment of the invention, the effluent from the reaction zone will inherently contain hydrogen sulfide so the subsequent hydrogenation step is not necessary in order to produce the hydrogen sulfide recycle stream. However, the incorporation of the hydrogenation step similarily as shown in FIG. 1 is preferred in order to convert the minor amounts of sulfur dioxide and sulfur which inevitably will be present in the off gas to hydrogen sulfide. Thus, the sulfur values which are subject to the subsequent absorption and regeneration procedure will for all practical purposes be in the form of hydrogen sulfide. As an alternative to the subsequent hydrogenation step, steps can be taken to treat the off gas effluent from the reactor to remove elemental sulfur, and more importantly, sulfur dioxide. For example, the reactor effluent may be cooled sufficiently, e.g., to a temperature of about 119° C. to condense substantially all of the elemental sulfur and then treated with a caustic solution in order to neutralize the sulfur dioxide.

Figure 3:
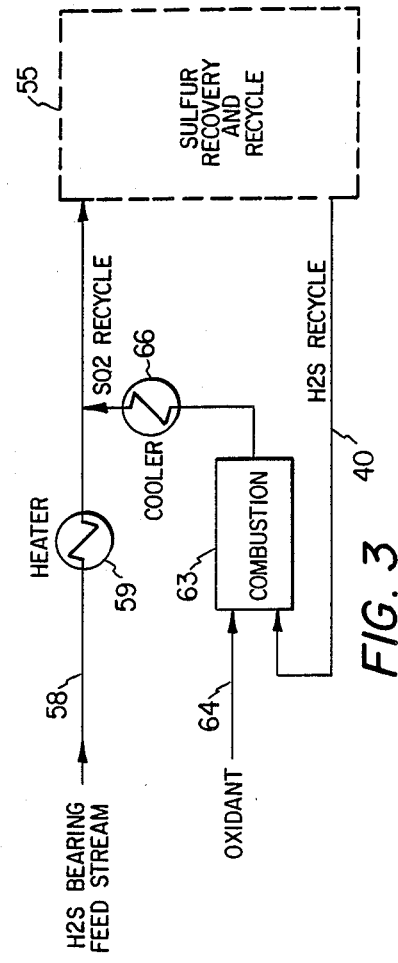
FIG. 3 is a flow diagram showing another embodiment of the invention particularly adapted for the direct conversion of a low hydrogen sulfide content feedstream.

A suitable treating system for use in processing a hydrogen sulfide bearing feedstream is shown in FIG. 3. In this case, the feedstream is applied via line 58 and heater 59 to a sulfur recovery and recycle system 55 which may be, and preferably is, identical to the system shown in FIG. 1 as indicated by bracket A—A. That is, it includes a hydrogenation step subsequent to the sulfur producing reaction step. The hydrogen sulfide bearing recycle stream 40 is applied to a combustion chamber 63 which is also supplied with an oxident such as air or oxygen enriched air via line 64. In the combustion chamber, hydrogen sulfide in the recycle stream is converted to sulfur dioxide. The effluent from the combustion chamber 63 containing the converted sulfur dioxide is passed through a cooler 66 to bring it to a temperature, normally within the range of about 300° C. consistent with the temperature of the feed gas stream from heater 59.

An example of the operation of the embodiment of the invention shown in FIG. 3 can be seen from the processing of a feedstream having a composition (on a dry basis) of 12.6 pound-mols per hr. of hydrogen sulfide and 75.7 pound-mols per hr. of carbon dioxide. The sulfur balances in the system for successive passes through the system to the equilibrium state are shown in Table VII. The assumed conditions are as follows:

| Reaction Temperature | 204° C. |
|---|---|
| Pressure | 25.2 psia |
| Condensation on temperature | 320° F. |

TABLE VII

| | TIME | | | | | |
|---|---|---|---|---|---|---|
| | 1 | 2 | 3 | 4 | 5 | 6 |
| Feed $H_2S$ | 12.6 | 12.6 | 12.6 | 12.6 | 12.6 | 12.6 |
| Recyc $SO_2$ | 0 | 12.6 | 7.7 | 5.8 | 4.9 | 4.4 |
| Total S | 12.6 | 25.2 | 20.3 | 18.4 | 17.5 | 17.0 |
| Prod. S | 0 | 17.5 | 14.5 | 13.5 | 13.1 | 12.6 |
| Res. S | 0 | 7.7 | 5.8 | 4.9 | 4.4 | 4.4 |

The sulfur balance relationships shown in Table VII are realistic when one considers that the sulfur producing reaction will go only about 80% or less to completion. In theory, if not in practice, the reaction could be driven to substantially 100% completion by immediate condensation of the sulfur from the vapor phase so that it is not available for the reverse reaction. In this case, partial combustion of the recycle stream to provide a $SO_2/H_2S$ mol ratio of less than 2 would be effective to provide a recycle stream which ultimately would bring about a stoichiometrically imbalanced equilibrium condition in the reaction zone. Again, assuming that the Claus reaction is driven to completion with no reactants in the product stream, combustion of the $H_2S$ containing recycle stream to provide a $SO_2/H_2S$ ratio of more than 2 would result in a system which would not equilibrate within the reaction zone.

In actual practice, where the Claus reaction is not driven to completion, partial combustion of the hydrogen sulfide recycle stream is not necessary for the equilibrium condition but can be employed to arrive at a stable stoichiometric relationship in the reaction zone.

In the case of partial conversion of the hydrogen sulfide in the recycle stream to sulfur dioxide, the sulfur balance for successive passes through the system for the same composition as simulated for in Table VII, are set forth below in Table VIII. Table VIII corresponds generally to Table VII above except that it has been expanded to accommodate recycled and total hydrogen sulfide as well as the other component parts shown in common with Table VII. The system simulated in Table VIII is for the case in which 2/3 of the $H_2S$ recycle is oxidized to provide a converted recycle stream having an $SO_2/H_2S$ mol ratio of 2. The reactions zone conditions are the same as for the system of Table VII.

TABLE VIII

Figure 4:
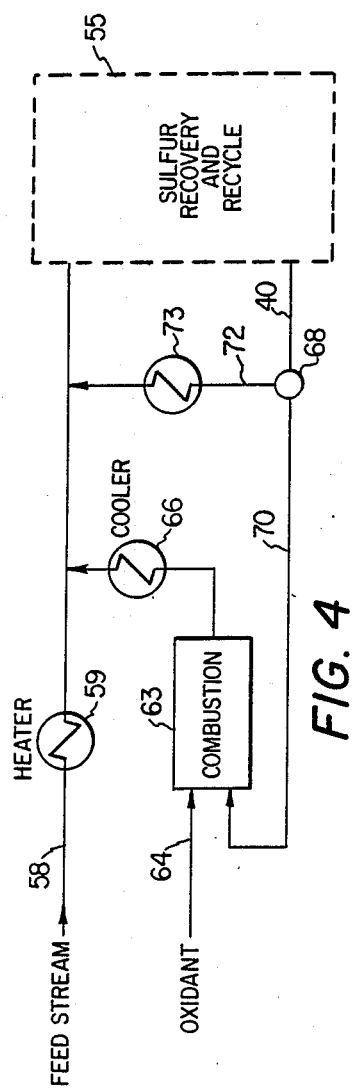
FIG. 4 is a schematic illustration of a modified form of the embodiment shown in FIG. 3.

| | TIME | | | | | | | | | |
|---|---|---|---|---|---|---|---|---|---|---|
| | 1 | 2 | 3 | 4 | 5 | 6 | 7 | 8 | 9 | 10 |
| Feed $H_2S$ | 12.6 | 12.6 | 12.6 | 12.6 | 12.6 | 12.6 | 12.6 | 12.6 | 12.6 | 12.6 |
| Rec. S | 0 | 12.6 | 5.0 | 7.9 | 5.3 | 7.7 | 5.6 | 6.4 | 6.5 | 6.5 |
| Rec $H_2S$ | 0 | 4.2 | 1.7 | 2.6 | 1.8 | 2.6 | 1.9 | 2.1 | 2.2 | 2.2 |
| Rec $SO_2$ | 0 | 8.4 | 3.3 | 5.3 | 3.5 | 5.1 | 3.7 | 4.3 | 4.3 | 4.3 |
| Tot $H_2S$ | 12.6 | 16.8 | 14.3 | 15.2 | 14.4 | 15.2 | 14.5 | 14.7 | 14.8 | 14.8 |
| Total S | 12.6 | 25.2 | 17.6 | 20.5 | 17.9 | 20.3 | 18.2 | 19.0 | 19.1 | 19.1 |
| Prod. S | 0 | 20.2 | 9.7 | 15.2 | 10.2 | 14.7 | 11.8 | 12.5 | 12.6 | 12.6 |
| Res. S | 12.6 | 5.0 | 7.9 | 5.3 | 7.7 | 5.6 | 6.4 | 6.5 | 6.5 | 6.5 |

Where partial combustion of the hydrogen sulfide bearing recycle stream is employed it will be preferred to split the stream and subject the converted recycle portion of the stream to combustion in the presence of an essentially stoichiometric amount of oxidizing agent. Operation in accordance with this embodiment of the invention is illustrated in FIG. 4, in which like elements are identified by the same reference numbers as used in FIG. 3. As shown in FIG. 4 the stream is split by means of a stream divider 68 into a line 70 applied to combustion chamber 63 and a line 72 which is applied through a heater 73 directly to the front of the sulfur producing reactor. The output from the combustion chamber 63 is passed through cooler 66 as described above. Thus the $SO_2$ containing recycle stream and the $H_2S$ recycle stream are cooled and heated respectively to provide the desired operating temperature within the reactor. This mode of operation lessens the likelihood of premature sulfur production on the inlet side of the reactor.

In the invention as described thus far, the Claus reaction between hydrogen sulfide and sulfur dioxide is carried out at an elevated temperature, e.g., 150° C.–300°C. under conditions to produce the sulfur in the form of mist and vapor which is then cooled and condensed for sulfur recovery. An alternative procedure which is useful for very dilute gas streams involves carrying out the Claus reaction (1) under sub dewpoint conditions, i.e., at a temperature and pressure at which the major portion of the sulfur condenses as it is produced. This invention is especially useful in that gas containing no more than about 2 vol.% hydrogen sulfide or about 2 vol.% sulfur dioxide (or a mixture of hydrogen sulfide and sulfur dioxide) can be reacted under conditions in which the produced sulfur is condensed in and adsorbed on the catalyst bed, although the technique can be applied at higher concentrations of sulfur species. This offers the advantage of greatly reducing the portion of total produced sulfur which is recycled by minimizing mist and vapor carryover which, in the case of low sulfur content streams, would involve a relatively high percentage of the recycled sulfur.

In carrying this embodiment of the invention, the reaction is carried out in the catalyst bed at a temperature below the dewpoint of sulfur at the pressure in the reactor and preferably above the freezing point to provide immediate sulfur condensation in the bed. The pressure and temperature are such as to keep the system below the sulfur dewpoint but above the water dewpoint. Suitable temperatures would be within the range of about 120° C.–135° C. at pressures ranging from atmospheric to about 30 psia. The catalysts described previously may be employed in this embodiment of the invention, with alumina being preferred.

Implementation of this embodiment of the invention normally requires the use of at least two beds with facilities to alternate the beds in a sulfur reaction and regeneration cycle. The beds may be operated in a fixed-bed mode or fluid-bed mode. In either case, regeneration of the sulfur loaded catalyst bed can be accomplished by passing a hot inert gas such as process gas through the loaded catalyst bed and then on to a condenser to remove the vaporized sulfur.

In another embodiment of the invention, the system illustrated in FIG. 1 is employed in the treatment of off gases from a Claus unit but with application of the sulfur bearing recycle stream to the feed of the final or an intermediate Claus unit catalytic reactor of a multi-stage Claus plant rather than to a separate reactor preceding the hydrogenation reactor. In this case, the hydrogen sulfide bearing gas may be recycled directly to the front of the Claus unit reactor or it may be applied to a combustion unit where the hydrogen sulfide is oxidized to sulfur dioxide. In either case, the Claus unit prior to the reactor to which the recycle stream is applied is operated at an off-stoichiometric condition to provide an integrated system exhibiting the negative feedback mode providing good efficiency and ease of control.

Figure 5:
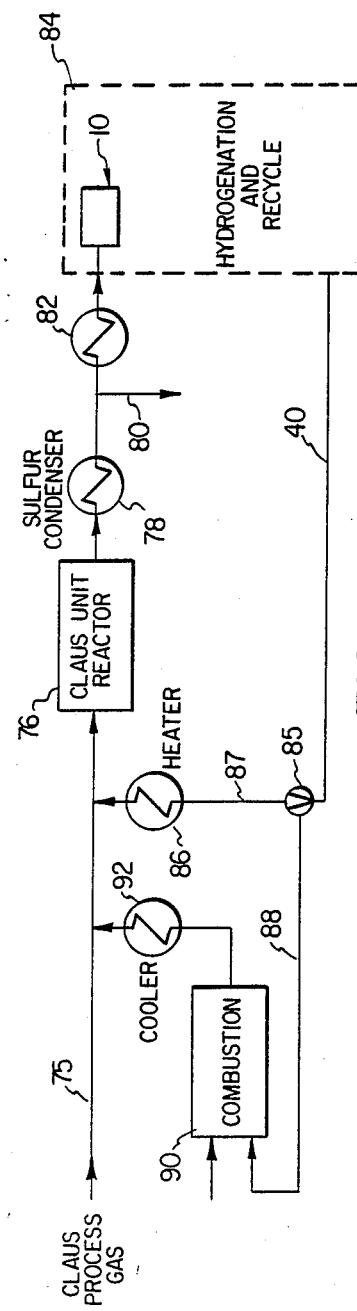
FIG. 5 is a schematic illustration of a flow diagram showing a further embodiment of the invention as applied to the operation of a conventional Claus plant.

This embodiment of the invention is illustrated in FIG. 5. As shown in FIG. 5, Claus process gas is applied via line 75 to a Claus unit reactor 76 which may be the final reaction unit or an intermediate reaction unit in a multistage Claus plant. The output from the Claus reactor is passed to a sulfur condenser 78 and product sulfur line 80 and then to a heater 82. The output from heater 82 is passed to a hydrogenation reaction zone 10 which is the initial stage of a hydrogenation and hydrogen sulfide recycle system 84 which except for the absence of sulfur producing reactor 4, and associated equipment, is the same as that shown in FIG. 1 to the right of bracket A—A. The recycle stream 40 is applied via a valve 85 to one of lines 87 and 88. Line 87 is equipped with a heater 86 so that the hydrogen sulfide bearing stream may be heated and applied directly to the front of the Claus unit 76. Line 88 is equipped with a combustion unit 90 so that alternatively hydrogen sulfide in the stream can be converted to sulfur dioxide which is then cooled in cooler 92 and applied to the front of the Claus unit reactor 76. In addition, the embodiment of FIG. 5 may be carried out with recycle of both hydrogen sulfide and sulfur dioxide similarly as in the case of the embodiment of FIG. 4, or the recycle stream 40 may be alternately applied to lines 88 and 87 so as to alternate between sulfur dioxide and hydrogen sulfide recycle. The preferred mode of operation will be with a single component recycle, normally hydrogen sulfide applied via line 87. However, operating parameters of the Claus unit to which the invention is applied may dictate the use of one or the other techniques.

Another embodiment of the invention is employed in lieu of conventional split flow Claus processing. In a split flow Claus unit, the processing gas is split into two components; one is applied to a combustion zone and the other is applied directly to a Claus reaction zone. The split portion of the stream applied to the combustion zone is typically burned with an amount of air to provide an overall $H_2S/SO_2$ ratio of 2 and the $H_2S$ quantity to the combustion zone is usually the largest quantity which will permit sustained combustion with the air. In the present invention, a feed stream containing an intermediate level of hydrogen sulfide, typically within the range of about 15–45 volume percent, that would normally be processed by the split-flow procedure, is applied entirely to a combustion step. In this embodiment of the invention illustrated in FIG. 6, sufficient oxygen is supplied to the combustion zone to burn more than one third, and preferably within the range of 40–70%, of the hydrogen sulfide to sulfur dioxide. The sulfur dioxide and hydrogen sulfide react thermally under the combustion conditions to convert a substantial portion, up to about 60%, of the sulfur content of the feed to elemental sulfur. The sulfur is condensed to produce sulfur product. The off-gas from the combustion zone contains a stoichiometrically excess amount of sulfur dioxide and is applied to a catalytic sulfur producing reactor as described previously. This embodiment of the invention is particularly applicable to the processing of streams containing about 15 to 45% hydrogen sulfide and offers an advantage over the conventional split-flow procedure since sulfur production is achieved thermally in the combustion reaction zone. This may be contrasted with the split-flow procedure in which the thermal decomposition and corresponding sulfur production from the bypassed portion of the stream is not achieved until the streams are recombined.

Figure 6:
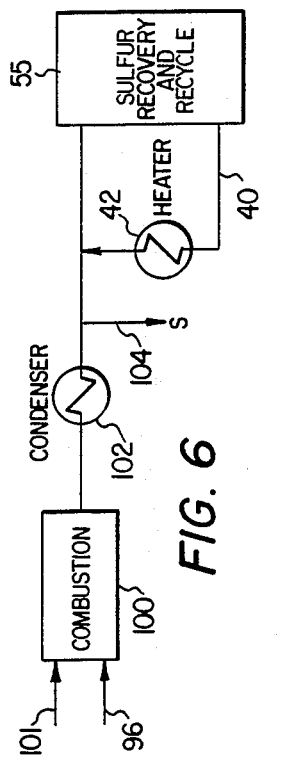
FIG. 6 is a schematic illustration of another embodiment of the invention.

As shown in FIG. 6, a processing gas stream 96 is passed to a combustion zone 100 in which a portion of the hydrogen sulfide within the stream is oxidized to sulfur dioxide. An oxidant is supplied via line 101 in an amount to provide substantially stable combustion of more than 1/3 of the hydrogen sulfide in the processing stream to produce an excess amount of sulfur dioxide relative to the stoichiometrically equivalent amount indicated by reaction 1. The output from the combustion zone 100 is supplied through a sulfur condensor 102 where produced sulfur is condensed and separated for withdrawal via line 104. The effluent stream containing sulfur dioxide is applied along with a hydrogen sulfide bearing recycle stream from line 40 containing heater 42 to the Claus reactor 4 of a sulfur recovery and recycle unit 55 which may be identical in all respects to the sulfur recovery and recycle system of FIG. 1.

In further application of the present invention, there is provided a process useful in the treatment of gas streams, particularly high pressure gas streams, which contain carbon dioxide and light hydrocarbons in addition to hydrogen sulfide. An especially suitable application of this embodiment of the invention is in the treatment of sour gas produced from subterranean-oil bearing reservoirs which are subjected to enhanced recovery by carbon dioxide injection. This process is also applicable to the treatment of sour natural gas.

Such enhanced oil recovery processes are well-known to those skilled in the art and involve the injection of a carbon dioxide containing gas into the subterranean hydrocarbon reservoir through an injection system comprising one or more wells. As the carbon dioxide moves through the reservoir, it acts to displace oil therein to a production system composed of one or more wells through which the oil and gas are recovered. The produced fluids from the production wells are passed to a separator facility for the separation of gas, oil, and water, and the gas is then subject to further processing. Typically where such gas contains sulfur, and thus is termed sour gas, it is a conventional practice to pass the gas stream from the oil-gas separating system to a sweetening unit which typically will involve the use of an aqueous amine solution for absorption and regeneration to remove carbon dioxide and hydrogen sulfide from the produced gas. The gas supplied to the amine unit is usually under a moderate to high pressure, dictated by the production and surface processing operation, within the range of about 50 to about 1500 psig. The hydrocarbon content of the processed gas will include methane, ethane and usually also propane. Butane and lesser amounts of $C_4+$ hydrocarbons, primarily pentane and hexane, may also be present.

In the sweetening unit, it is a common practice to regenerate the rich absorbent solution by a heating process which is carried out at a relatively low temperature, normally on the order of about 5 to 15 psig. The hydrogen sulfide and carbon dioxide from the regeneration unit may then be supplied to a Claus sulfur recovery unit which is attended by the production of elemental sulfur and treatment of the Claus unit tail gases by any suitable technique.

In accordance with the present invention, there is provided a new and improved process for treating sour gas streams containing hydrocarbons and carbon dioxide from the above described or other sources by mixing the hydrogen sulfide containing gas with added sulfur dioxide and passing the gas to a Claus reaction zone where elemental sulfur is produced. The residual sulfur in the offgas from the Claus unit is subjected to hydrogenation to produce hydrogen sulfide, and the hydrogen sulfide, and to a lesser extent carbon dioxide, are separated from the gaseous hydrocarbons by any suitable means such as by the use of a conventional amine sweetener. The carbon dioxide and gaseous hydrocarbons are, of course, unaffected by the sulfur production and the hydrogenation reactions.

Figure 7:
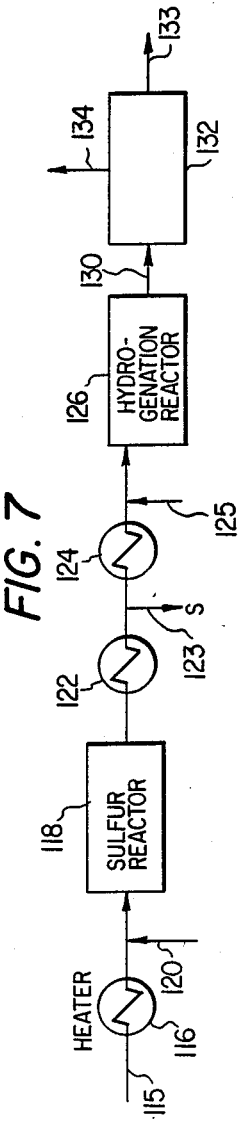
FIG. 7 is a schematic illustration of another embodiment of the invention for the processing under high pressure conditions of a sour gas hydrocarbon stream containing minor amounts of hydrogen sulfide.

FIG. 7 illustrates a schematic flow diagram illustrating this embodiment of the invention. A sour gas stream 115 containing gaseous hydrocarbons, carbon dioxide, and a minor amount of hydrogen sulfide is applied through a heater 116 to a Claus sulfur reaction unit 118. The hydrogen sulfide normally will be present in a small amount, commonly less than 1 or 2%. The feedstream normally will be free of sulfur dioxide although it may sometimes contain trace amounts of sulfur dioxide such that the hydrogen sulfide is present in an amount in excess of the stoichiometric equivalent for the Claus reaction with sulfur dioxide, similarly as described with respect to the embodiment of FIG. 3. An added quantity of sulfur dioxide is supplied via line 120 to provide a mixture of hydrogen sulfide and sulfur dioxide within reactor 118 for the Claus reaction. The output from the sulfur production unit 118 is applied to a cooler 122 for the condensation of elemental sulfur which is removed via line 123. The offgas containing residual sulfur is applied through a heater 124 to a hydrogenation zone 126. A hydrogen containing gas supplied by any suitable source, as described previously, is applied via line 125 to the hydrogenation zone. Within the hydrogenation zone, the residual sulfur values in the offgas to the extent they are not already in the form of hydrogen sulfide, are converted to hydrogen sulfide.

The effluent gas stream from the hydrogenation zone is applied via line 130 to an extraction unit 132. Unit 132 may be of any suitable type and may, for example, include an absorption column and a regeneration column with peripheral equipment as described previously with respect to FIG. 1. Within the extraction unit, hydrogen sulfide is extracted from the effluent stream by passing the stream into contact with an absorption solvent in the absorption column. If it is desired to remove the $CO_2$ at this point an appropriate relatively nonselective solvent may be used. If it is intended to use the extracted $H_2S$ as a source for reactant $SO_2$, as described below, then the solvent is a preferential absorbent for hydrogen sulfide in the presence of carbon dioxide and the gaseous hydrocarbons. The gaseous hydrocarbons will be less subject to absorption than carbon dioxide so any of the aforementioned solvents which can be used for selective absorption of hydrogen sulfide in the presence of carbon dioxide can be employed here. The rich solvent containing the hydrogen sulfide is passed from the absorption zone to a regeneration zone, for example, similar to the column 28 shown in FIG. 1, where hydrogen sulfide is stripped from the rich solvent to produce a hydrogen sulfide enriched stream. This stream is withdrawn from the unit 132 via line 133 for further processing as described hereinafter. The gaseous hydrocarbons are withdrawn from unit 132 via line 134. This stream will have a much reduced hydrogen sulfide content and normally a somewhat reduced carbon dioxide content. Stream 134 may be passed to the pipeline or it may be employed as a fuel at the site. Carbon dioxide may or may not be separated from stream 134 in either of these applications. If carbon dioxide is separated, it normally will be reinjected into the subterranean oil reservoir in the enhanced oil recovery procedure. The sulfur dioxide supplied through line 120 may be obtained from an independent source or it may be produced by combustion of the sulfur withdrawn via line 123 or by combustion of hydrogen sulfide in the hydrogen sulfide containing gas stream 133. As described hereinafter, the latter mode of operation is preferred.

In a further aspect of the invention, the feed gas stream is subjected to a prior separation step in which the heavier hydrocarbons are separated from the stream prior to its application to the reactor 118. Specifically, the separated heavier hydrocarbon fraction is composed predominantly of $C_4+$ hydrocarbons, principally pentane and hexane in order to avoid the presence of these hydrocarbons in the catalyst bed of the sulfur reactor 118. In this regard such heavier hydrocarbons may be subject to cracking in the catalyst bed with attendant deactivation of the catalyst. Particularly in the case where the light hydrocarbon output from unit 132 is to be employed as a fuel, the separated heavier hydrocarbon fraction is supplied to the output 134 from the extraction unit where the two fractions are recombined.

Figure 8:
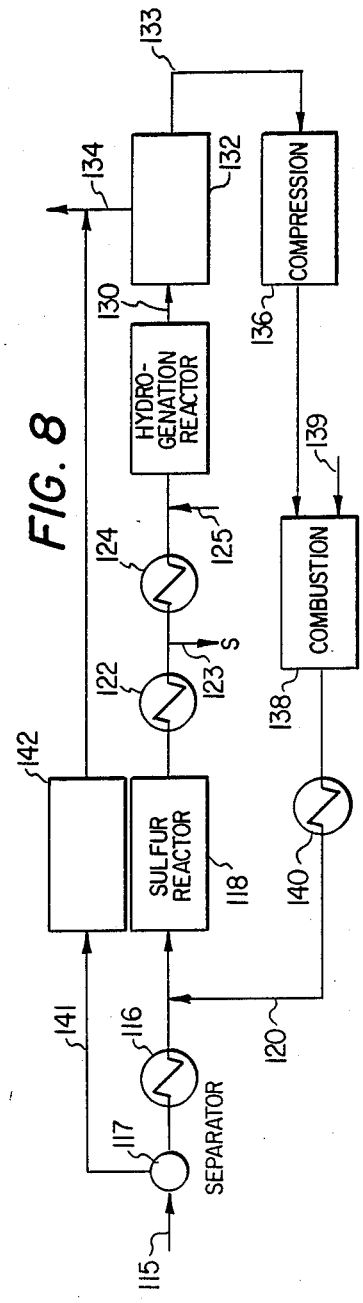
FIG. 8 is an illustration of a further modification of the embodiment shown in FIG. 7.

Turning now to FIG. 8, there is illustrated a preferred embodiment of the invention involving oxidation of the hydrogen sulfide output from unit 132 and recycle of the resulting sulfur dioxide to the reactor unit 118 along with prior separation of a heavier hydrocarbon fraction. In FIG. 8, the same components as shown in FIG. 7 are indicated by like reference numerals. In this embodiment of the invention, the gas stream 115 is applied to a separator 117 where a designated heavy hydrocarbon fraction is separated from the stream and applied via line 141 to a conventional desulfurization unit 142. The desulfurization unit may be of any suitable design. The desulfurized heavy hydrocarbon fraction is then mixed with the light fraction in line 134. The light process hydrocarbon fraction from separator 117 is applied via heater 116 to sulfur reactor 118 for processing as described previously. The enriched gas stream 133 is passed to a compressor stage 136 where the pressure of the stream is increased to a level compatible with the high pressure gas stream input to reactor 118. The output from the compressor stage is supplied to a oxidation unit 138 along with a suitable oxident supplied via line 139. The oxident may take the form of air, oxygen enriched air, or oxygen. Oxidation within unit 138 may be thermal or catalytic and all or part of the hydrogen sulfide in the recycle stream may be converted to sulfur dioxide as described previously with respect to FIGS. 3 and 4. However, preferably substantially all the hydrogen sulfide in the recycle stream is converted to sulfur dioxide. The sulfur dioxide containing recycle stream emanating from combustion unit 138 is then passed to a cooler 140, for example to recover heat as steam. The cooling step minimizes the possibility that hydrocarbons in the recycle stream will be cracked due to extremely high temperatures of combustion. The gas is then supplied via line 120 for mixture with the sour gas stream applied to unit 118. It will be recognized that this embodiment of the invention offers the same advantages of a negative feedback system which will ultimately stabilize to produce an equilibrium condition within reactor 118, similarly as described previously with respect to the embodiments of the invention depicted in FIGS. 3 and 4.

This embodiment of the invention offers a number of advantages in the treatment of sour gas streams involved in oil production operations. The sulfur production step may be carried out under high pressure conditions consistent with the pressure of the produced gas stream. Low molecular weight mercaptan compounds, which are often found in such sour gas streams and are difficult to treat, are converted by the hydrogenation step to hydrogen sulfide. Operation of the sulfur production step and the hydrogenation step at higher pressures enables the methane (and other light hydrocarbons) in the gas and the $CO_2$ to be withdrawn from unit 134 at a relatively higher pressure approximately equal to the pressure in the production manifolding. Thus, the light hydrocarbons and carbon dioxide can be efficiently and economically passed to the pipeline or the carbon dioxide can be extracted under high pressure conditions for reinjection into the oil bearing formation.

Depending upon the pressure conditions within the sulfur reactor 118, the Claus reaction may be carried out under pressure and temperature conditions at which water co-condenses with the sulfur in the sulfur-condenser 122 or at somewhat higher pressure conditions at which the water of reaction condenses as it is produced within the sulfur reactor 118. For example, where the field gas is at a relatively low pressure and the sulfur reactor is operated at a pressure of about 40 to 115 psia, the water at the normal Claus reaction temperature of 150° C. or above will be carried over to condenser 122 with the sulfur. However, where the field gas is at a substantially higher pressure, the sulfur reactor 118 may likewise operate at a relatively high pressure so that the water produced at the normal Claus reaction temperature will be condensed within the reactor as it is produced. For example, at a reaction temperature of 200° C., operating the reactor at a pressure of 225 psia or more will result in water condensation within the sulfur reactor. At a higher Claus temperature of about 250° C., operation of the sulfur reactor in excess of 600 psia will result in the water reaction being condensed as it is produced.

The sulfur reaction may also be carried out in a liquid medium, e.g., an aqueous solution of sodium citrate, as described previously at pressure and temperature conditions at which both the sulfur and water products of the reaction are condensed in liquid form as they are produced. For example, at a pressure of about 65 psia or above, the sulfur producing reaction may be carried out at a temperature of about 120° C. at which both the sulfur and the water products will be in liquid form.

Having described specific embodiments of the present invention, it will be understood that modification thereof may be suggested to those skilled in the art, and it is intended to cover all such modifications as fall within the scope of the appended claims.

We claim:

1. In the treatment of a feed gas stream containing sulfur dioxide in an amount in excess of the stoichiometric equivalent for the Claus reaction with hydrogen sulfide to produce elemental sulfur, the process comprising:
    (a) passing said sulfur dioxide containing feed gas stream to a reaction zone for the production of elemental sulfur by the Claus reaction and an off-gas stream containing sulfur dioxide;
    (b) passing said off-gas stream to a hydrogenation zone in which the sulfur dioxide in said off-gas stream is hydrogenated to produce hydrogen sulfide which is contained in an effluent gas stream from said hydrogenation zone;
    (c) passing the effluent gas stream from said hydrogenation zone to a hydrolysis zone and within said hydrolysis zone hydrolyzing reduced sulfur values in said effluent stream to produce hydrogen sulfide;
    (d) extracting hydrogen sulfide from said effluent gas to produce a hydrogen sulfide containing recycle stream which is distinct from said feed gas stream;
    (e) passing said extracted hydrogen sulfide in said recycle stream to said reaction zone in addition to said feed gas stream; and
    (f) concomitantly with step (e) continuing to pass said feed gas stream to said reaction zone, said feed gas stream continuing to contain sulfur dioxide in an amount in excess of the stoichiometric equivalent for the Claus reaction.

2. The method of claim 1 wherein said hydrolysis zone contains titania catalyst for said hydrolysis reaction.

3. The method of claim 1 wherein the effluent stream from said hydrogenation zone is subject to a hydration step prior to passage of said gases to said hydrolysis zone.

4. The method of claim 1 wherein the effluent stream from hydrogenation zone is heated prior to passing said gas stream to said hydrolysis zone.

5. In the treatment of a feed gas stream which includes an insert gas fraction and contains sulfur dioxide in an amount in excess of the stoichiometric equivalent for the Claus reaction with hydrogen sulfide to produce elemental sulfur, said feed gas stream containing hydrogen sulfide in an amount to provide a mole ratio of sulfur dioxide to hydrogen sulfide greater than 0.5 and wherein the cumulative amounts of hydrogen sulfide and sulfur dioxide are present in said feed gas stream in a minor fraction relative to said inert gas fraction, the process comprising:
    (a) passing said sulfur dioxide containing feed gas stream to a reaction zone for the production of elemental sulfur by the Claus reaction and an off-gas stream containing sulfur dioxide;
    (b) passing said off-gas stream to a hydrogenation zone in which the sulfur dioxide in said off-gas stream is hydrogenated to produce hydrogen sulfide which is contained in an effluent gas stream from said hydrogenation zone;
    (c) extracting hydrogen sulfide from said effluent gas by passing said effluent gas stream to an absorption zone, within said absorption zone contacting said effluent gas stream with an absorption medium which will selectively absorb hydrogen sulfide in the presence of said inert gas fraction, passing rich solvent from said absorption zone to a desorption zone, and within said desorption zone stripping hydrogen sulfide from said rich solvent to produce a hydrogen sulfide containing recycle stream which is distinct from said feed gas stream;

(d) passing said extracted hydrogen sulfide in said recycle stream to said reaction zone in addition to said feed gas stream; and (e) concomitantly with step (d) continuing to pass said feed gas stream to said reaction zone, said feed gas stream continuing to contain sulfur dioxide in an amount in excess of the stoichiometric equivalent for the Claus reaction.

6. The method of claim 5 wherein said feed gas stream is a Claus unit tail gas.

7. The method of claim 6 further comprising the step of subjecting reduced sulfur values in said off-gas stream to a hydrolysis reaction to produce hydrogen sulfide.

8. The method of claim 7 wherein said hydrolysis reaction occurs concomitantly with the hydrogenation reaction of step (b) of claim 1.

9. The method of claim 5 further comprising the step subsequent to step (a) and prior to step (b) of claim 1 passing the off-gas stream from said reaction zone to a hydrolysis zone wherein reduced sulfur values within said off-gas stream are converted to hydrogen sulfide.

10. In the treatment of a feed gas stream containing sulfur dioxide in an amount in excess of the stoichiometric equivalent for the Claus reaction with hydrogen sulfide to produce elemental sulfur, the process comprising:

(a) deriving said feed gas stream by oxidation of a source gas containing sulfur values in combustible form to produce sulfur dioxide contained in said feed gas stream;

(b) passing said sulfur dioxide containing feed gas stream to a reaction zone for the production of elemental sulfur by the Claus reaction and an off-gas stream containing sulfur dioxide;

(c) passing said off-gas stream to a hydrogenation zone in which the sulfur dioxide in said off-gas stream is hydrogenated to produce hydrogen sulfide which is contained in an effluent gas stream from said hydrogenation zone;

(d) extracting hydrogen sulfide from said effluent gas to produce a hydrogen sulfide containing recycle stream which is distinct from said feed gas stream;

(e) passing said extracted hydrogen sulfide in said recycle stream to said reaction zone in addition to said feed gas stream; and (f) concomitantly with step (e) continuing to pass said feed gas stream to said reaction zone, said feed gas stream continuing to contain sulfur dioxide in an amount in excess of the stoichiometric equivalent for the Claus reaction.

11. The method of claim 10 wherein said source gas is a Claus unit tail gas containing hydrogen sulfide and sulfur dioxide as a minor fraction and an inert gas fraction as a major fraction.

12. In the treatment of a feed gas stream containing sulfur dioxide in an amount in excess of the stoichiometric equivalent for the Claus reaction with hydrogen sulfide to produce elemental sulfur, the process comprising:

(a) deriving said feed stream by thermal decomposition of oxidized sulfur values selected from the group consisting of sulfuric acid, sulfate salts, sulfite salts, and mixtures thereof to produce said feed stream containing sulfur dioxide;

(b) passing said sulfur dioxide containing feed gas stream to a reaction zone for the production of elemental sulfur by the Claus reaction and an off-gas stream containing sulfur dioxide;

(c) passing said off-gas stream to a hydrogenation zone in which the sulfur dioxide in said off-gas stream is hydrogenated to produce hydrogen sulfide which is contained in an effluent gas stream from said hydrogenation zone;

(d) extracting hydrogen sulfide from said effluent gas to produce a hydrogen sulfide containing recycle stream which is distinct from said feed gas stream;

(e) passing said extracted hydrogen sulfide in said recycle stream to said reaction zone in addition to said feed gas stream; and (f) concomitantly with step (e) continuing to pass said feed gas stream to said reaction zone, said feed gas stream continuing to contain sulfur dioxide in an amount in excess of the stoichiometric equivalent for the Claus reaction.

13. The method of claim 12 wherein the thermal decomposition of said oxidized sulfur values is carried out by combustion of a hydrogen sulfide containing fuel in the presence of said oxidized sulfur values.

14. In the treatment of a feed gas stream containing sulfur dioxide in an amount in excess of the stoichiometric equivalent for the Claus reaction with hydrogen sulfide to produce elemental sulfur, the process comprising:

(a) deriving said feed stream by mixing a hydrogen sulfide containing source gas and a sulfur dioxide containing source gas in proportionate amounts to produce said feed stream having a sulfur dioxide-hydrogen sulfide mole ratio greater than 0.5;

(b) passing said sulfur dioxide containing feed gas stream to a reaction zone for the production of elemental sulfur by the Claus reaction and an off-gas stream containing sulfur dioxide;

(c) passing said off-gas stream to a hydrogenation zone in which the sulfur dioxide in said off-gas stream is hydrogenated to produce hydrogen sulfide which is contained in an effluent gas stream from said hydrogenation zone;

(d) extracting hydrogen sulfide from said effluent gas to produce a hydrogen sulfide containing recycle stream which is distinct from said feed gas stream;

(e) passing said extracted hydrogen sulfide in said recycle stream to said reaction zone in addition to said feed gas stream; and (f) concomitantly with step (e) continuing to pass said feed gas stream to said reaction zone, said feed gas stream continuing to contain sulfur dioxide in an amount in excess of the stoichiometric equivalent for the Claus reaction.

15. The method of claim 14 wherein said hydrogen sulfide containing gas is a Claus unit tail gas.

16. In the treatment of a feed gas stream containing sulfur dioxide in an amount in excess of the stoichiometric equivalent for the Claus reaction with hydrogen sulfide to produce elemental sulfur, the process comprising:

(a) deriving said feed stream by passing a source gas containing hydrogen sulfide to a thermal Claus reaction zone along with an oxidant in an amount to provide oxidation of more than one-third but less than all of the hydrogen sulfide in said source gas stream to produce sulfur dioxide in an amount in excess of the stoichiometric equivalent to the remaining hydrogen sulfide, reacting said sulfur dioxide and hydrogen sulfide to produce elemental sulfur by the Claus reaction which is recovered as sulfur product and an off-gas stream which comprises said feed gas stream;
  (b) passing said sulfur dioxide containing feed gas stream to a reaction zone for the production of elemental sulfur by the Claus reaction and an off-gas stream containing sulfur dioxide;
  (c) passing said off-gas stream to a hydrogenation zone in which the sulfur dioxide in said off-gas stream is hydrogenated to produce hydrogen sulfide which is contained in an effluent gas stream from said hydrogenation zone;
  (d) extracting hydrogen sulfide from said effluent gas to produce a hydrogen sulfide containing recycle stream which is distinct from said feed gas stream;
  (e) passing said extracted hydrogen sulfide in said recycle stream to said reaction zone in addition to said feed gas stream; and
  (f) concomitantly with step (e) continuing to pass said feed gas stream to said reaction zone, said feed gas stream continuing to contain sulfur dioxide in an amount in excess of the stoichiometric equivalent for the Claus reaction.

17. The method of claim 16 wherein said source gas stream contains hydrogen sulfide within the range of about 15-45 volume percent.

18. The method of claim 17 wherein the amount of hydrogen sulfide in said source gas stream converted to sulfur dioxide is within the range of about 40-70%.

19. In the treatment of a feed gas stream containing sulfur dioxide in a concentration of 2 volume percent or less and in an amount in excess of the stoichiometric equivalent for the Claus reaction with hydrogen sulfide to produce elemental sulfur, the process comprising:
  (a) passing said sulfur dioxide containing feed gas stream to a reaction zone for the production of elemental sulfur by the Claus reaction and an off-gas stream containing sulfur dioxide and operating said reaction zone at a temperature below the dew point of sulfur whereby elemental sulfur in said reaction zone is condensed therein as said sulfur is produced;
  (b) passing said off-gas stream to a hydrogenation zone in which the sulfur dioxide in said off-gas stream is hydrogenated to produce hydrogen sulfide which is contained in an effluent gas stream from said hydrogenation zone;
  (c) extracting hydrogen sulfide from said effluent gas to produce a hydrogen sulfide containing recycle stream which is distinct from said feed gas stream;
  (d) passing said extracted hydrogen sulfide in said recycle stream to said reaction zone in addition to said feed gas stream; and
  (e) concomitantly with step (d) continuing to pass said feed gas stream to said reaction zone, said feed gas stream continuing to contain sulfur dioxide in an amount in excess of the stoichiometric equivalent for the Claus reaction.

20. In the treatment of a feed gas stream containing hydrogen sulfide in an amount in excess of the stoichiometric equivalent for the Claus reaction with sulfur dioxide to produce elemental sulfur, the process comprising:
  (a) passing said hydrogen sulfide containing feed gas stream to a reaction zone for the production of elemental sulfur by the Claus reaction and an off-gas stream containing hydrogen sulfide;
  (b) extracting hydrogen sulfide from said off-gas stream to produce a hydrogen sulfide containing recycle stream which is distinct from said feed gas stream;
  (c) at least partially oxidizing the hydrogen sulfide in said distinct recycle stream to produce a converted recycle stream containing sulfur dioxide;
  (d) passing said converted recycle stream to said reaction zone in addition to said feed gas stream; and
  (e) concomitantly with step (d) continuing to pass said feed gas stream to said reaction zone, said feed gas stream continuing to contain hydrogen sulfide in an amount in excess of the stoichiometric equivalent for the Claus reaction.

21. The method of claim 20 further comprising the step of prior to said extraction step, passing the off-gas stream from said reaction zone to a hydrogenation zone in which sulfur dioxide in said off-gas stream is hydrogenated to produce hydrogen sulfide.

22. The method of claim 20 wherein the sulfur dioxide/hydrogen sulfide mole ratio of said converted recycle stream is greater than 0.5.

23. The method of claim 20 wherein said feed gas stream includes an inert gas fraction and wherein hydrogen sulfide is extracted from said hydrogenation zone effluent gas stream by passing said effluent gas stream to an absorption zone, within said absorption zone contacting said gas stream with an absorption solvent which is a preferential absorbent for hydrogen sulfide in the presence of said inert gas fraction, passing rich solvent from said absorption zone to a desorption zone, and within said rich solvent to produce said hydrogen sulfide containing recycle stream.

24. The method of claim 23 wherein the hydrogen sulfide in said feed gas stream is present in a minor amount relative to said inert gas fraction.

25. The method of claim 22 wherein said feed gas stream contains sulfur dioxide in an amount to provide a mole ratio of sulfur dioxide to hydrogen sulfide of less than 0.5 and wherein the cumulative amount of hydrogen sulfide and sulfur dioxide are present in said feed gas stream in a minor fraction relative to said gas fraction.

26. The method of claim 20 wherein said feed gas stream contains hydrogen sulfide in a concentration of 2 volume percent or less and further comprising the step of operating said reaction zone in step (a) at a temperature below the dew point of sulfur whereby elemental sulfur in said reaction zone is condensed therein as said sulfur is produced.

27. In the treatment of a hydrogen sulfide containing feed gas stream by the Claus process, the method comprising:
  (a) passing said feed gas stream to a first Claus reaction zone wherein a portion of the hydrogen sulfide therein is oxidized to sulfur dioxide under conditions in which the hydrogen sulfide and sulfur dioxide react for the production of elemental sulfur and an off-gas stream containing sulfur dioxide and hydrogen sulfide;
  (b) passing said off-gas stream to a second Claus reaction zone for the production of elemental sulfur by reaction of hydrogen sulfide with sulfur dioxide and the production of a second off-gas stream containing hydrogen sulfide and sulfur dioxide;
(c) passing said second off-gas stream to a hydrogenation zone in which the sulfur dioxide therein is hydrogenated to produce hydrogen sulfide;
(d) withdrawing an effluent gas stream containing said hydrogen sulfide from said hydrogenation zone,
(e) extracting hydrogen sulfide from said hydrogenation zone effluent;
(f) adding said extracted hydrogen sulfide to a recycle gas stream which is applied to said second Claus reaction zone and not to said first Claus reaction zone.

28. The method of claim 27 wherein prior to the application of said recycle stream to said second Claus reaction zone, said recycle stream is passed to a combustion zone for the conversion of hydrogen sulfide to sulfur dioxide, and applying said converted recycle stream containing sulfur dioxide to said second Claus reaction zone.

29. The method of claim 28 wherein said first Claus unit is operated under conditions to provide more than a stoichiometrically equivalent amount of sulfur dioxide for the Claus reaction.

30. The method of claim 27 wherein said hydrogen sulfide bearing recycle gas stream is applied directly to said second Claus reaction zone.

31. The method of claim 30 wherein said first Claus reaction zone is operated under conditions to provide less than the stoichiometrically equivalent amount of sulfur dioxide for said Claus reaction.

32. In the treatment of a feed gas stream containing carbon dioxide, gaseous hydrocarbons, and a minor amount of hydrogen sulfide, said hydrogen sulfide being present in an amount in excess of the stoichiometric equivalent for the Claus reaction with sulfur dioxide to produce elemental sulfur, the method comprising:
(a) passing said gas stream and an added quantity of sulfur dioxide to a reaction zone wherein said hydrogen sulfide and sulfur dioxide are reacted by the Claus reaction to produce elemental sulfur and an off-gas containing residual sulfur;
(b) recovering said elemental sulfur as a sulfur product;
(c) passing said off-gas stream containing residual sulfur to a hydrogenation zone to hydrogenate unreduced sulfur contained in an effluent gas stream from said hydrogenation zone to hydrogen sulfide;
(d) extracting hydrogen sulfide from said effluent stream by passing said effluent stream to an absorption zone and within said absorption zone, contacting said gas stream with an absorption solvent which is a preferential absorbent for hydrogen sulfide in the presence of said carbon dioxide and gaseous hydrocarbons;
(e) withdrawing said gas stream containing said gaseous hydrocarbons and carbon dioxide and having a reduced hydrogen sulfide content from said absorption zone;
(f) passing rich solvent from said absorption zone to a desorption zone and within said desorption zone stripping hydrogen sulfide from said rich solvent to produce a hydrogen sulfide enriched gas stream;
(g) at least partially oxidizing the hydrogen sulfide in said enriched gas stream to produce a recycle stream containing sulfur dioxide; and
(h) employing said recycle stream as a source of added sulfur dioxide for passage to said reaction zone in accordance with step (a).

* * * * *